United States Patent
Lu et al.

(10) Patent No.: US 10,592,723 B2
(45) Date of Patent: Mar. 17, 2020

(54) FINGERPRINT-SENSING APPARATUS

(71) Applicant: Au Optronics Corporation, Hsinchu (TW)

(72) Inventors: Wen-Je Lu, Hsinchu (TW); Yu-Jung Liu, Kaohsiung (TW)

(73) Assignee: Au Optronics Corporation, Hsinchu (TW)

( * ) Notice: Subject to any disclaimer, the term of this patent is extended or adjusted under 35 U.S.C. 154(b) by 35 days.

(21) Appl. No.: 15/997,719

(22) Filed: Jun. 5, 2018

(65) Prior Publication Data
US 2019/0286872 A1    Sep. 19, 2019

(30) Foreign Application Priority Data
Mar. 16, 2018  (TW) .............................. 107109137 A

(51) Int. Cl.
*G06K 9/00* (2006.01)
(52) U.S. Cl.
CPC ............ *G06K 9/0008* (2013.01); *G06K 9/001* (2013.01); *G06K 9/0002* (2013.01)
(58) Field of Classification Search
CPC ..... G06K 9/0008; G06K 9/0002; G06K 9/001
See application file for complete search history.

(56) References Cited

U.S. PATENT DOCUMENTS

| | | | |
|---|---|---|---|
| 6,091,837 A | 7/2000 | Dinh | |
| 6,633,656 B1 * | 10/2003 | Picard | .................. G01K 17/003 340/5.53 |
| 9,060,142 B2 | 6/2015 | Venkataraman et al. | |
| 10,339,358 B2 * | 7/2019 | Ding | |
| 2002/0068240 A1 * | 6/2002 | Teng | ..................... B41C 1/1008 430/280.1 |
| 2004/0208345 A1 * | 10/2004 | Chou | ................... G06K 9/0002 382/124 |

(Continued)

FOREIGN PATENT DOCUMENTS

| CN | 1180998 | 5/1998 |
|---|---|---|
| CN | 103065452 | 4/2013 |

(Continued)

*Primary Examiner* — Utpal D Shah
(74) *Attorney, Agent, or Firm* — JCIPRNET

(57) ABSTRACT

A fingerprint-sensing apparatus is provided. The fingerprint-sensing apparatus includes a fingerprint-sensing pixel array and a plurality of read-out circuits. The fingerprint-sensing pixel array has a plurality of fingerprint-sensing pixel columns, and each of the plurality of fingerprint sensing pixel columns includes a plurality of fingerprint-sensing pixels. Each of the plurality of fingerprint-sensing pixels includes a scanning switch and a thermosensitive current generation circuit. The scanning switch is controlled by a row scanning signal. The thermosensitive current generation circuit generates a thermosensitive current according to the fingerprint-sensing pixel corresponding to a fingerprint ridge or a fingerprint valley. The plurality of read-out circuits is respectively coupled to the plurality of fingerprint-sensing pixel columns. The read-out circuits receive the thermosensitive current provided by the fingerprint-sensing pixels and generate a fingerprint-sensing signal according to the thermosensitive current.

9 Claims, 3 Drawing Sheets

(56) References Cited

U.S. PATENT DOCUMENTS

| | | | |
|---|---|---|---|
| 2015/0071323 A1* | 3/2015 | Lee | G06K 9/0002 |
| | | | 374/45 |
| 2017/0293791 A1 | 10/2017 | Mainguet et al. | |
| 2019/0148618 A1* | 5/2019 | Revaux | H01L 37/02 |

FOREIGN PATENT DOCUMENTS

| | | |
|---|---|---|
| CN | 103440755 | 12/2013 |
| CN | 106203301 | 12/2016 |
| CN | 107004125 | 8/2017 |

\* cited by examiner

FINGERPRINT-SENSING APPARATUS

CROSS-REFERENCE TO RELATED APPLICATION

This application claims the priority benefit of Taiwan application serial no. 107109137, filed on Mar. 16, 2018. The entirety of the above-mentioned patent application is hereby incorporated by reference herein and made a part of this specification.

BACKGROUND OF THE INVENTION

Field of the Invention

The invention relates to a sensing apparatus, and more particularly, to a fingerprint-sensing apparatus suitable for fingerprint recognition.

Description of Related Art

A thermal fingerprint-sensing apparatus has advantages such as resistance to pollution and interference caused by an electromagnetic signal and lack of an external optical system compared to an optical fingerprint-sensing apparatus and a capacitive fingerprint-sensing apparatus. Therefore, the thermal fingerprint-sensing apparatus has gradually gained attention.

In general, the thermal fingerprint-sensing apparatus requires a plurality of heatable devices such that a plurality of heating devices is maintained at a specified sensing temperature. The heating devices can have different heat dissipation speeds corresponding to a fingerprint ridge or fingerprint valley, such that the sensing temperature of the heating devices can generate different temperature variations according to the fingerprint ridge or fingerprint valley to achieve the recognition effect of the fingerprint ridge or fingerprint valley.

However, the thermal fingerprint-sensing apparatus requires a heating circuit to main the plurality of heating devices at a specified sensing temperature. Moreover, when the thermal fingerprint-sensing apparatus is sensing a fingerprint, if the sensing time is too long, then the thermal fingerprint-sensing apparatus reaches thermal equilibrium, and as a result, the thermal fingerprint-sensing apparatus reduces the recognition effect of the fingerprint ridge or fingerprint valley.

SUMMARY OF THE INVENTION

The invention provides a fingerprint-sensing apparatus. The fingerprint-sensing apparatus of the invention does not require a heating device and a heating circuit, and can effectively reduce the sensing time of an entire fingerprint.

The fingerprint-sensing apparatus of the invention includes a fingerprint-sensing pixel array and a plurality of read-out circuits. The fingerprint-sensing pixel array has a plurality of fingerprint-sensing pixel columns, and each of the plurality of fingerprint sensing pixel columns includes a plurality of fingerprint-sensing pixels. Each of the plurality of fingerprint-sensing pixels includes a scanning switch and a thermosensitive current generation circuit. The scanning switch is respectively controlled by a row scanning signal to be turned on or off. The thermosensitive current generation circuit generates an insensitive current according to the fingerprint-sensing pixel corresponding to a fingerprint ridge or a fingerprint valley. The plurality of read-out circuits is respectively coupled to the plurality of fingerprint-sensing pixel columns, wherein each of the plurality of read-out circuits receives the thermosensitive current provided by the fingerprint-sensing pixel corresponding to the scanning switch that is turned on via the scanning switch and generates a fingerprint-sensing signal according to the thermosensitive current. The scanning switches of the plurality of fingerprint-sensing pixels in the same row of the fingerprint-sensing pixel array are controlled by the same row scanning signal.

Based on the above, the fingerprint-sensing apparatus of the invention includes a fingerprint-sensing pixel array and a plurality of read-out circuits. The fingerprint-sensing pixel array has a plurality of fingerprint-sensing pixel columns. The read-out circuits receive the thermosensitive current provided by the thermosensitive current generation circuit and generate a fingerprint-sensing signal according to the thermosensitive current. Therefore, the fingerprint-sensing apparatus does not require a heating device and a heating circuit. Moreover, the scanning switches of the plurality of fingerprint-sensing pixels in the same row of the fingerprint-sensing pixel array are controlled by the same row scanning signal, and therefore the fingerprint-sensing apparatus of the invention can effectively reduce the sensing time of an entire fingerprint.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
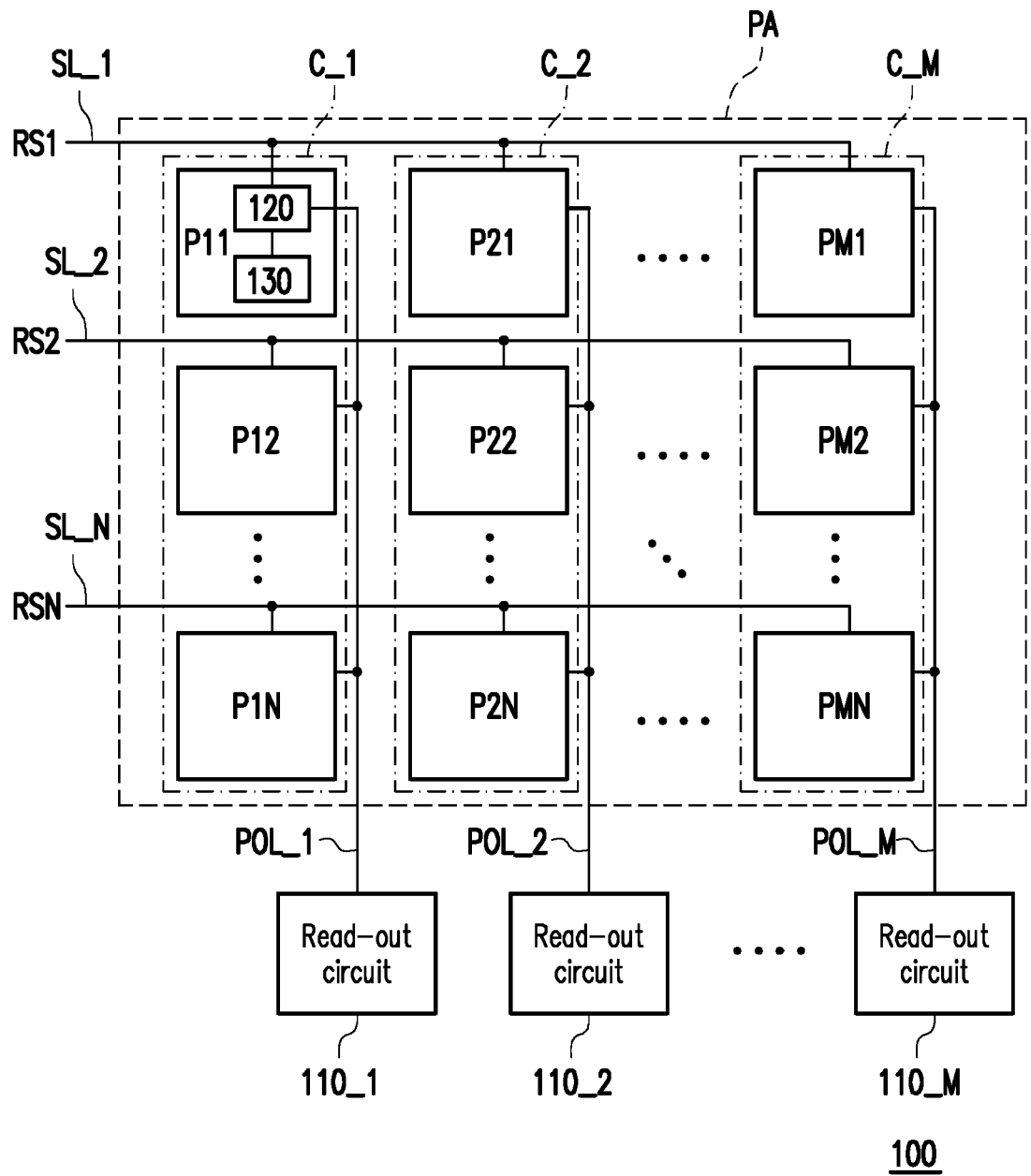
FIG. 1 is a schematic of a fingerprint-sensing apparatus shown according to an embodiment of the invention.

Referring to FIG. 1, FIG. 1 is a schematic of a fingerprint-sensing apparatus shown according to an embodiment of the invention. In the embodiment of FIG. 1, a fingerprint-sensing apparatus 100 includes a fingerprint-sensing pixel array PA and read-out circuits 110_1 to 110_M. The fingerprint-sensing pixel array PA has fingerprint-sensing pixel columns C_1 to C_M. The fingerprint-sensing pixel column C_1 includes fingerprint-sensing pixels P11 to P1N, and the fingerprint-sensing pixel column C_2 includes fingerprint-sensing pixels P21 to P2N . . . etc. In the present embodiment, fingerprint-sensing pixels P11 to PM1 in the same row in the fingerprint-sensing pixel array PA receive a row scanning signal RS1 via a row scanning line SL_1, and fingerprint-sensing pixels P12 to PM2 in the same row in the fingerprint-sensing pixel array PA receive a row scanning signal RS2 via a row scanning line SL_2 . . . etc. The read-out circuit 110_1 is coupled to the fingerprint-sensing pixel column C_1 via a read-out signal line POL_1, and the read-out circuit 110_2 is coupled to the fingerprint-sensing pixel column C_2 via a read-out signal line POL_2 . . . etc. In particular, M and N are natural numbers greater than 1. In some embodiments, row scanning signals RS1 to RSN can be generated via a plurality of shift registers connected in series, but the invention is not limited thereto.

Each of the fingerprint-sensing pixels P11 to PMN includes a scanning switch and a thermosensitive current generation circuit. For instance, in FIG. 1, the fingerprint-sensing pixel P11 includes a scanning switch 120 and a thermosensitive current generation circuit 130. The scanning switch 120 receives the row scanning signal RS1 via the row scanning line SL_1, and the scanning switch 120 is controlled by the row scanning signal RS1 to be turned on or off. The scanning switch 120 can be any form of transistor switch. The thermosensitive current generation circuit 130 of the fingerprint-sensing pixel P11 generates a thermosensitive current according to the fingerprint-sensing pixel P11 corresponding to a fingerprint ridge or a fingerprint valley of a fingerprint. The read-out circuit 110_1 receives a thermosensitive current provided by the fingerprint-sensing pixel P11 via the scanning switch 120 that is turned on and the read-out signal line POL_1. Moreover, the read-out circuit 110_1 generates a fingerprint-sensing signal according to the thermosensitive current. Therefore, the thermosensitive current generation circuit 130 of the fingerprint-sensing pixel P11 can generate a thermosensitive current according to the fingerprint-sensing pixel P11 corresponding to a fingerprint ridge or a fingerprint valley of a fingerprint. The read-out circuit 110_1 generates a fingerprint-sensing signal according to the thermosensitive current. As a result, the fingerprint-sensing apparatus 100 does not require a heating device and a heating circuit to achieve the effect of fingerprint sensing.

Moreover, it should be mentioned that, in the present embodiment, the scanning switches of the fingerprint-sensing pixels in the same row (such as the fingerprint-sensing pixels P11 to PM1) of the fingerprint-sensing pixel array PA are controlled by the same row scanning signal (such as the row scanning signal RS1). Therefore, the scanning switches of the fingerprint-sensing pixels in the same row can be turned on or off at the same time, and the scanning switches of the fingerprint-sensing pixels in different rows are not turned on or off at the same time. As a result, the read-out circuits 110_1 to 110_M can receive the thermosensitive current provided by the fingerprint-sensing pixels in the same row row-by-row to further generate a plurality of fingerprint-sensing signals, and the fingerprint-sensing apparatus 100 can effectively reduce the sensing time of an entire fingerprint.

Figure 2:
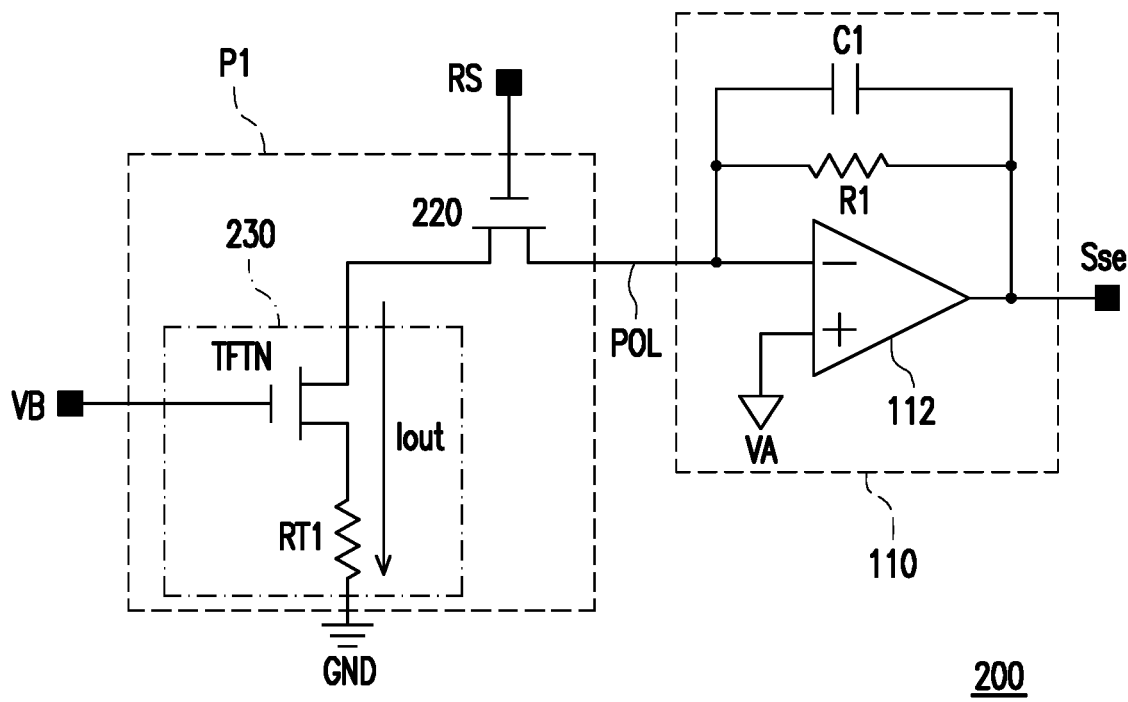
FIG. 2 is a schematic of a fingerprint-sensing apparatus shown according to another embodiment of the invention.

Furthermore, referring to FIG. 2, FIG. 2 is a schematic of a fingerprint-sensing apparatus shown according to another embodiment of the invention. In the embodiment of FIG. 2, the fingerprint-sensing pixel P1 includes a scanning switch 220 and a thermosensitive current generation circuit 230. The scanning switch 220 has a first terminal, a second terminal, and a control terminal, and the first terminal of the scanning switch 220 is coupled to the read-out circuit 110. The second terminal of the scanning switch 220 is coupled to the thermosensitive current generation circuit 230. The control terminal of the scanning switch 220 is configured to receive the scanning signal RS. The thermosensitive current generation circuit 230 includes a transistor TFTN and a thermistor RT1. The transistor TFTN is an N-type transistor. The transistor TFTN has a first terminal, a second terminal, and a control terminal. The first terminal of the transistor TFTN is coupled to the scanning switch 220. The second terminal of the transistor TFTN is coupled to the first terminal of the thermistor RT1. The control terminal of the transistor TFTN is configured to receive a bias voltage VB. The bias voltage VB can be, for instance, a DC voltage source. The transistor TFTN is operated in a work area in a saturated zone according to the bias voltage VB such that the voltage level of the second terminal of the transistor TFTN can be maintained at a fixed voltage level. The thermistor RT1 has a first terminal and a second terminal, the first terminal of the thermistor RT1 is coupled to the second terminal of the transistor TFTN, and the first terminal of the thermistor RT1 is coupled to a system low voltage GND (such as 0 V). The thermosensitive current generation circuit 230 can generate a thermosensitive current Iout according to the resistance value of the thermistor RT1 and the voltage value of the bias voltage VB. The current value of the thermosensitive current Iout can be obtained according to the following equation.

$$i\_RT1 = (v\_bias - Vth\_TFTN)/r\_RT1 \quad \text{(equation 1)}$$

In particular, i_RT1 is the current value of the thermosensitive current Iout, v_bias is the voltage value of the bias voltage VB, Vth_TFTN is the threshold voltage value of the transistor TFTN, and r_RT1 is the resistance value of the thermistor RT1. In other words, the current value of the thermosensitive current Iout can be changed according to the variation in the resistance value of the thermistor RT1.

In the present embodiment, when a finger is in contact with the fingerprint-sensing apparatus 200, the fingerprint ridge of the finger is in direct contact with the fingerprint-sensing apparatus 200, and the fingerprint valley of the finger is not in contact with the fingerprint-sensing apparatus 200. For instance, the temperature of the sensing environment (such as 27 Celsius) is, for instance, less than the temperature of the human skin surface (such as 36 Celsius to 37 Celsius), and the thermistor RT1 is, for instance, a negative temperature coefficient thermistor. If the fingerprint-sensing pixel P1 corresponds to the fingerprint ridge, then the thermistor RT1 generates a first resistance value corresponding to the fingerprint ridge according to the temperature of the fingerprint ridge. If the fingerprint-sensing pixel P1 corresponds to the fingerprint valley, then the thermistor RT1 generates a second resistance value corresponding to the fingerprint valley according to the temperature of the fingerprint valley. The temperature of the fingerprint ridge is substantially close to or equal to the temperature of the human skin surface, and the temperature of the fingerprint valley is substantially between the temperature of the sensing environment and the temperature of the human skin surface (such as 33 Celsius to 35 Celsius). Therefore, in the case that the temperature of the fingerprint ridge is higher than the temperature of the fingerprint valley, the first resistance value is substantially less than the second resistance value. As a result, the current value of the thermosensitive current Iout corresponding to the fingerprint ridge is greater than the current value of the thermosensitive current Iout corresponding to the fingerprint valley. For instance, the temperature of the sensing environment (such as 40 Celsius) is, for instance, higher than the temperature of the human skin surface, and the thermistor RT1 is, for instance, a negative temperature coefficient thermistor. As a result, the current value of the thermosensitive current Iout corresponding to the fingerprint ridge is less than the current value of the thermosensitive current Iout corresponding to the fingerprint valley. The thermistor RT1 of the invention can be a negative temperature coefficient thermistor or a positive temperature coefficient thermistor.

In some embodiments, when the fingerprint-sensing pixel P1 does not correspond to the fingerprint ridge and fingerprint valley, the thermistor RT1 generates a third resistance value according to the ambient temperature (such as 27 Celsius). The thermosensitive current generation circuit 230 generates a thermosensitive current Iout corresponding to the ambient temperature according to the bias voltage VB and the third resistance value. The current value of the thermosensitive current Iout corresponding to the ambient temperature is different from the current value of the thermosensitive current Iout corresponding to the fingerprint ridge and the current value of the thermosensitive current Iout corresponding to the fingerprint valley.

The read-out circuit 110 includes an operational amplifier 112, a resistor R1, and a capacitor C1. The operational amplifier 112 has an inverting input terminal, a non-inverting input terminal, and an output terminal. The inverting input terminal of the operational amplifier 112 is coupled to the thermosensitive current generation circuit 230 via the scanning switch 220. The non-inverting input terminal of the operational amplifier 112 is coupled to a reference voltage signal VA. The output terminal of the operational amplifier 112 is configured to output a fingerprint-sensing signal Sse. The resistor R1 is coupled between the inverting input terminal and the output terminal of the operational amplifier 112. The capacitor C1 is coupled between the inverting input terminal and the output terminal of the operational amplifier 112. The operational amplifier 112 of the read-out circuit 110 can receive the thermosensitive current Iout generated by the thermosensitive current generation circuit 230 via a read-out signal line POL and the scanning switch 220 that is turned on. In the present embodiment, the reference voltage signal VA can be a DC voltage. The reference voltage signal VA of the invention can be any form of voltage signal, but is not limited to the present embodiment.

Figure 3:
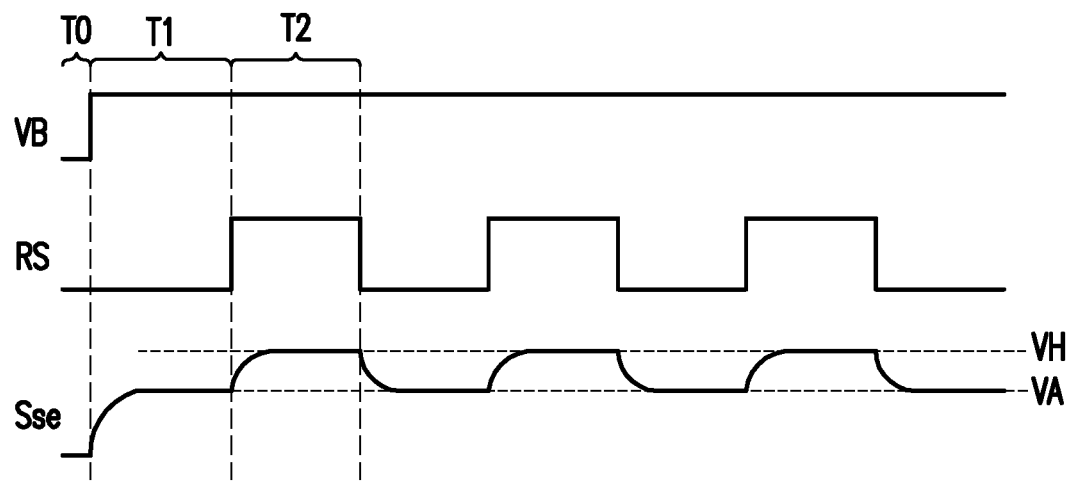
FIG. 3 is a schematic of the operation waveform of a fingerprint-sensing apparatus shown according to an embodiment of the invention.

The operating method of the fingerprint-sensing apparatus is further described herein. Referring to both FIG. 2 and FIG. 3, FIG. 3 is a schematic of the operation waveform of a fingerprint-sensing apparatus shown according to an embodiment of the invention. In the embodiments of FIG. 2 and FIG. 3, in a stop-sensing period T0, the voltage value of the bias voltage VB is in a low-voltage level (such as 0 V) state, and the reference voltage signal VA is also in a low-voltage level (such as 0 V) state (the waveform of the reference voltage signal VA is not shown in the present embodiment). The transistor TFTN is in an off state due to the low voltage level of the bias voltage VB, and the reference voltage signal VA is also in a low-voltage level, and therefore the fingerprint-sensing signal Sse is substantially maintained at the low-voltage level of the reference voltage signal VA in the stop-sensing period T0.

When the stop-sensing period T0 is ended, the voltage level of the bias voltage VB begins to be raised to a high voltage level (such as 24 V), and the reference voltage signal VA also begins to be raised to a high voltage level (such as 10 V) to begin entering the first sensing period T1. In the first sensing period T1, the transistor TFTN of the fingerprint-sensing pixel P1 is operated in the work area in a saturated zone according to the high voltage level of the bias voltage VB, and therefore the thermosensitive current generation circuit 230 begins to generate the thermosensitive current Iout according to the fingerprint-sensing pixel P1 corresponding to a fingerprint ridge or a fingerprint valley of a finger, and therefore the scanning switch 220 is in an off state. Therefore, the waveform of the first sensing period T1 of the fingerprint-sensing signal Sse is equal to the waveform of the reference voltage signal VA. In other words, the voltage level of the fingerprint-sensing signal Sse in the first sensing period T1 is substantially equal to the voltage level of the reference voltage signal VA.

When the logic level of the row scanning signal RS is raised to a high logic level, a second sensing period T2 is reached.

In the second sensing period T2, the scanning switch 220 is turned on by the high logic level of the row scanning signal RS. The operational amplifier 112 of the read-out circuit 110 can receive the thermosensitive current Iout generated by the thermosensitive current generation circuit 230 via a read-out signal line POL and the scanning switch 220 that is turned on. The voltage level of the fingerprint-sensing signal Sse in the second sensing period T2 is shown in equation 2 below.

$$VH = v\_VA + (i\_RT1) \times r\_R1 \qquad \text{(equation 2)}$$

In particular, VH is the voltage value of the fingerprint-sensing signal Sse in the second sensing period T2, v_VA is the voltage level of the reference voltage signal VA, and r_R1 is the resistance value of the thermistor RT1. In other words, when the scanning switch 220 is turned on in the second sensing period T2, the read-out circuit can generate the fingerprint-sensing signal Sse according to the resistor R1, the thermosensitive current Iout, and the reference voltage signal VA. Next, equation 1 and equation 2 are combined to obtain equation 3 as shown below.

$$VH = v\_VA + (v\_bias - Vth\_TFTN) \times r\_R1/r\_RT1 \qquad \text{(equation 3)}$$

Based on equation 2 or equation 3, in the second sensing period T2, if the current value of the thermosensitive current Iout corresponding to the fingerprint ridge is greater than the current value of the thermosensitive current Iout corresponding to the fingerprint valley, then the voltage value VH of the fingerprint-sensing signal Sse corresponding to the fingerprint ridge is greater than the voltage value VH of the fingerprint-sensing signal Sse corresponding to the fingerprint valley. On the other hand, if the current value of the thermosensitive current Iout corresponding to the fingerprint ridge is less than the current value of the thermosensitive current Iout corresponding to the fingerprint valley, then the voltage value VH of the fingerprint-sensing signal Sse corresponding to the fingerprint ridge is less than the voltage value VH of the fingerprint-sensing signal Sse corresponding to the fingerprint valley. As a result, the fingerprint-sensing apparatus 200 can determine whether the fingerprint-sensing pixel P1 corresponds to the fingerprint ridge or the fingerprint valley according to the voltage value VH of the fingerprint-sensing signal Sse in the second sensing period T2.

In some embodiments, the fingerprint-sensing apparatus 200 can further generate a voltage value VH of the fingerprint-sensing signal Sse not corresponding to the fingerprint ridge and the fingerprint valley when the fingerprint-sensing pixel P1 does not correspond to the fingerprint ridge and the fingerprint valley. The voltage value VH of the fingerprint-sensing signal Sse corresponding to the ambient temperature is different from the voltage value VH of the fingerprint-sensing signal Sse corresponding to the fingerprint ridge and the voltage value VH of the fingerprint-sensing signal Sse corresponding to the fingerprint valley. Therefore, the fingerprint-sensing apparatus 200 can further determine whether the fingerprint-sensing pixel P1 corresponds to the fingerprint ridge, the fingerprint valley, or is not in contact with a finger according to the voltage value VH of the fingerprint-sensing signal Sse in the second sensing period T2.

Figure 4:
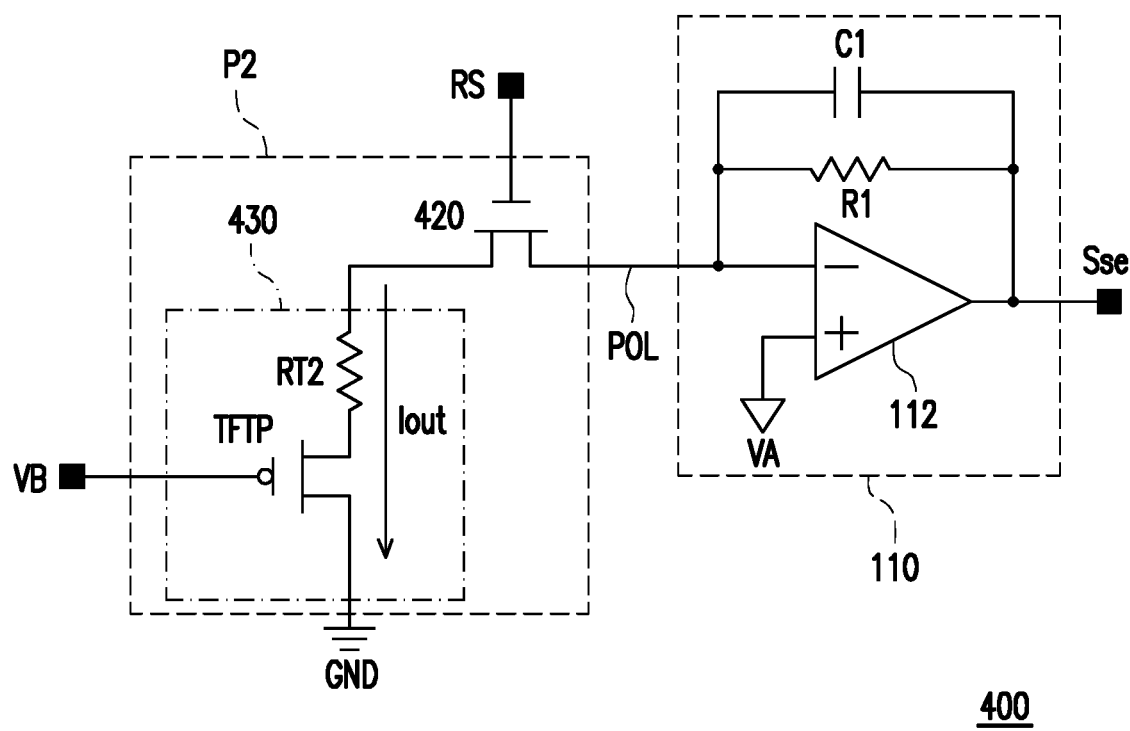
FIG. 4 is a schematic of a fingerprint-sensing apparatus shown according to yet another embodiment of the invention.

Referring to FIG. 4, FIG. 4 is a schematic of a fingerprint-sensing apparatus shown according to another embodiment of the invention. Different from FIG. 2, a thermosensitive current generation circuit 430 of a fingerprint-sensing apparatus 400 of FIG. 4 includes a transistor TFTP and a thermistor RT2. The transistor TFTP is a P-type transistor. The transistor TFTP has a first terminal, a second terminal, and a control terminal. The first terminal of the transistor TFTP is coupled to a system low voltage GND, and the second terminal of the transistor TFTP is coupled to the first terminal of the thermistor RT2. The control terminal of the transistor TFTP is configured to receive a bias voltage VB. In the present embodiment, the bias voltage VB can be, for instance, a DC voltage source (such as −24 V). The transistor TFTP is operated in a work area in a saturated zone according to the bias voltage VB such that the voltage level of the second terminal of the transistor TFTP can be maintained at a fixed voltage level. The thermistor RT2 has a first terminal and a second terminal, the first terminal of the thermistor RT2 is coupled to the second terminal of the transistor TFTP, and the first terminal of the thermistor RT2 is coupled to the second terminal of a scanning switch 420. The thermosensitive current generation circuit 430 can generate a thermosensitive current Iout according to the resistance value of the thermistor RT2 and the voltage value of the bias voltage VB. The current value of the thermosensitive current Iout can be obtained according to the following equation:

$$i\_RT2 = (-v\_bias + Vth\_TFTP)/r\_RT2 \quad \text{(equation 4)}$$

In particular, i_RT2 is the current value of the thermosensitive current Iout, v_bias is the voltage value of the bias voltage VB, Vth_TFTP is the threshold voltage value of the transistor TFTP, and r RT2 is the resistance value of the thermistor RT2. The embodiment details of the read-out circuit 110 of the fingerprint-sensing apparatus 400 and the operating method thereof are provided in in FIG. 2 and FIG. 3 and are therefore not repeated herein.

Based on the above, the fingerprint-sensing apparatus of the invention includes a fingerprint-sensing pixel array and a plurality of read-out circuits. The fingerprint-sensing pixel array has a plurality of fingerprint-sensing pixel columns. The read-out circuits receive the thermosensitive current provided by the thermosensitive current generation circuit and generate a fingerprint-sensing signal according to the thermosensitive current. Therefore, the fingerprint-sensing apparatus does not require a heating device and a heating circuit. Moreover, the scanning switches of the plurality of fingerprint-sensing pixels in the same row of the fingerprint-sensing pixel array are controlled by the same row scanning signal, and the plurality of read-out circuits can receive the thermosensitive current provided by the fingerprint-sensing pixels in the same row row-by-row to generate a plurality of fingerprint-sensing signals. As a result, the fingerprint-sensing apparatus can effectively reduce the sensing time of an entire fingerprint.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A fingerprint-sensing apparatus, comprising:
a fingerprint-sensing pixel array having a plurality of fingerprint-sensing pixel columns, wherein each of the fingerprint-sensing pixel columns comprises a plurality of fingerprint-sensing pixels, and each of the fingerprint-sensing pixels comprises:
a scanning switch controlled by a row scanning signal to be turned on or off; and
a thermosensitive current generation circuit generating a thermosensitive current according to the fingerprint-sensing pixel corresponding to a fingerprint ridge or a fingerprint valley, wherein the thermosensitive current generation circuit comprises:
a transistor, wherein the transistor has a first terminal, a second terminal, and a control terminal, the first terminal of the transistor is coupled to the scanning switch, and the control terminal of the transistor is configured to receive a bias voltage; and
a thermistor, wherein the thermistor has a first terminal and a second terminal, the first terminal of the thermistor is coupled to the second terminal of the transistor, and the first terminal of the thermistor is coupled to a system low voltage; and
a plurality of read-out circuits respectively coupled to the fingerprint-sensing pixel columns, wherein each of the read-out circuits receives the thermosensitive current provided by the fingerprint-sensing pixel corresponding to the scanning switch that is turned on via the scanning switch and generates a fingerprint-sensing signal according to the thermosensitive current,
wherein the scanning switches of the fingerprint-sensing pixels in a same row of the fingerprint-sensing pixel array are controlled by the same row scanning signal.

2. The fingerprint-sensing apparatus of claim 1, wherein the scanning switch has a first terminal, a second terminal, and a control terminal, the first terminal of the scanning switch is coupled to each of the read-out circuits respectively, the second terminal of the scanning switch is coupled to the thermosensitive current generation circuit, and the control terminal of the scanning switch is configured to receive the row scanning signal.

3. The fingerprint-sensing apparatus of claim 1, wherein when the fingerprint-sensing pixel corresponds to the fingerprint ridge, a first resistance value is generated according to a temperature of the fingerprint ridge, and when the fingerprint-sensing pixel corresponds to the fingerprint valley, a second resistance value is generated according to a temperature of the fingerprint valley.

4. The fingerprint-sensing apparatus of claim 1, wherein the transistor is operated in a work area in a saturated zone according to the bias voltage.

5. The fingerprint-sensing apparatus of claim 1, wherein the thermosensitive current generation circuit generates a first thermosensitive current corresponding to the fingerprint ridge according to the bias voltage and a first resistance value and generates a second thermosensitive current corresponding to the fingerprint valley according to the bias voltage and a second resistance value,
wherein a current value of the first thermosensitive current is greater than a current value of the second thermosensitive current.

6. The fingerprint-sensing apparatus of claim 1, wherein when the fingerprint-sensing pixel does not correspond to the fingerprint ridge and the fingerprint valley, the thermistor generates a third resistance value according to an ambient temperature and the thermosensitive current generation circuit generates a third thermosensitive current according to the bias voltage and the third resistance value.

7. The fingerprint-sensing apparatus of claim 1, wherein each of the read-out circuits comprises:
- an operational amplifier having an inverting input terminal, a non-inverting input terminal, and an output terminal, wherein the inverting input terminal of the operational amplifier is coupled to the thermosensitive current generation circuit via the scanning switch, the non-inverting input terminal of the operational amplifier receives a reference voltage signal, and the output terminal of the operational amplifier is configured to output the fingerprint-sensing signal;
- a resistor coupled between the inverting input terminal and the output terminal of the operational amplifier; and
- a capacitor coupled between the inverting input terminal and the output terminal of the operational amplifier.

8. The fingerprint-sensing apparatus of claim 7, wherein when the scanning switch is turned on, each of the read-out circuits generates the fingerprint-sensing signal according to the resistor, the thermosensitive current, and the reference voltage signal.

9. The fingerprint-sensing apparatus of claim 7, wherein when the scanning switch is turned off, each of the read-out circuits generates the reference voltage signal.

* * * * *